(12) United States Patent
Vaidyanathan et al.

(10) Patent No.: US 7,118,062 B2
(45) Date of Patent: Oct. 10, 2006

(54) WEB HANDLING WITH TENSION SENSING AND ADJUSTMENT

(75) Inventors: Nandakumar Vaidyanathan, Litchfield, NH (US); Steven Degon, Northboro, MA (US); Robert Bruce Lowd, Chestnut Hill, MA (US); Brian Roland Lamoureux, Pelham, NH (US); Keith Vaillancourt, Pelham, NH (US); James Hand, Pelham, NH (US)

(73) Assignee: Presstek, Inc., Hudson, NH (US)

( * ) Notice: Subject to any disclaimer, the term of this patent is extended or adjusted under 35 U.S.C. 154(b) by 0 days.

(21) Appl. No.: 10/632,237

(22) Filed: Jul. 31, 2003

(65) Prior Publication Data
US 2004/0030439 A1 Feb. 12, 2004

Related U.S. Application Data

(60) Provisional application No. 60/401,850, filed on Aug. 8, 2002.

(51) Int. Cl.
B65H 23/18 (2006.01)
(52) U.S. Cl. ............... 242/412.1; 242/412.2; 242/413.5; 242/418.1; 242/420.6; 242/538.2; 226/45; 700/122
(58) Field of Classification Search ............. 242/412.1, 242/413.5, 418.1, 417, 417.3, 419.1, 420.6, 242/421.7, 334.6, 357, 538.3, 538.2, 412.2; 226/44, 45; 700/122
See application file for complete search history.

(56) References Cited

U.S. PATENT DOCUMENTS

| | | |
|---|---|---|
| 3,737,230 A | 6/1973 | Van Meijel et al. |
| 3,854,329 A | 12/1974 | Jones |
| 3,974,974 A | 8/1976 | Nishikawa |
| 3,982,710 A | 9/1976 | Teumer |
| 4,473,009 A | 9/1984 | Morgan |
| 5,024,156 A | 6/1991 | Hank et al. |
| 5,039,027 A * | 8/1991 | Yanagihara et al. ..... 242/334.6 |
| 5,089,741 A * | 2/1992 | Park et al. .................. 310/332 |
| 5,130,744 A | 7/1992 | Hisada |
| 5,413,043 A | 5/1995 | Fuhrmann et al. |
| 5,435,242 A | 7/1995 | Kusch et al. |
| 5,470,005 A | 11/1995 | King et al. |
| 5,521,844 A | 5/1996 | Karis |
| 5,553,801 A * | 9/1996 | Lee ........................ 242/334.6 |
| 5,602,747 A | 2/1997 | Rajala |
| 5,629,487 A * | 5/1997 | Mucke et al. ................. 73/818 |
| 5,712,489 A | 1/1998 | Elvidge et al. |
| 5,727,749 A | 3/1998 | Pensavecchia et al. .. 242/538.3 |
| 5,757,641 A | 5/1998 | Minto ....................... 364/133 |
| 5,878,933 A | 3/1999 | Laughery ..................... 226/21 |
| 5,944,958 A | 8/1999 | Svanqvist ................... 162/281 |
| 5,992,789 A | 11/1999 | Lamothe .................. 242/418.1 |
| 6,026,747 A | 2/2000 | Carme et al. ............ 101/415.1 |
| 6,106,177 A | 8/2000 | Siegl et al. ................. 400/618 |
| 6,168,108 B1 | 1/2001 | Morley ..................... 242/421.1 |

(Continued)

*Primary Examiner*—John Q. Nguyen
(74) *Attorney, Agent, or Firm*—Goodwin Procter LLP

(57) ABSTRACT

A system of detecting and adjusting the normal force exerted by a web material around the circumferential surface of a cylinder is provided. Sensors associated with the cylinder surface are wired to a processor that compares detected normal web forces with a set value. An actuation device is activated by the processor to adjust the normal force exerted by the web by, e.g., adjusting the tension in the web material. A positioning device that preferably translates a web-wound spool is also provided as an option for the actuation device.

8 Claims, 8 Drawing Sheets

U.S. PATENT DOCUMENTS

| | | |
|---|---|---|
| 6,176,410 B1 | 1/2001 | Ueda et al. .................... 226/4 |
| 6,212,960 B1 * | 4/2001 | Durand-Texte et al. .. 73/862.07 |
| 6,250,220 B1 | 6/2001 | Sainio et al. ............... 101/228 |
| 6,293,031 B1 | 9/2001 | Ringbom et al. ............. 34/422 |
| 6,314,333 B1 | 11/2001 | Rajala et al. ............... 700/122 |
| 6,325,322 B1 | 12/2001 | Lewis .................... 242/538.2 |
| 6,387,214 B1 * | 5/2002 | Kustermann et al. ....... 162/198 |
| 6,525,754 B1 | 2/2003 | Landolt |
| 2001/0006029 A1 | 7/2001 | Ogawa et al. .............. 101/480 |

* cited by examiner

WEB HANDLING WITH TENSION SENSING AND ADJUSTMENT

CROSS-REFERENCE TO RELATED APPLICATIONS

This application is based on, and claims priority to, U.S. provisional patent application Ser. No. 60/401,850, filed Aug. 8, 2002, the entire disclosure of which is herein incorporated by reference.

BACKGROUND OF THE INVENTION

1. Field of the Invention

The present invention relates to digital printing apparatus and methods, and more particularly to an apparatus for continuously supplying lithographic printing material to the plate cylinder of a planographic printing press or a plate-material imager.

2. Description of the Related Art

Traditional techniques of printing an image onto a recording medium, such as paper, include letterpress printing, gravure printing and offset lithography. All of these printing methods require the use of plate material. This plate material is usually loaded onto a rotating plate cylinder that is brought into pressurable contact with the recording/printing medium.

In letterpress printing, the image is represented on the plate material as raised surfaces that accept ink and transfer it onto the medium. Gravure plates, in contrast, define a series of wells or indentations that accept ink for deposit onto the recording medium. Excess ink is removed from the plate material using a doctor blade or another similar device prior to contact between the plate and the recording medium.

In offset lithography, an image is defined on a printing plate defined by ink-accepting (oleophilic) areas surrounded by ink-repellent (oleophobic) surfaces. Two different lithographic systems are generally employed in offset lithography. In a dry printing system, the plate material is simply inked, and the image is transferred onto a recording/printing medium. First, the plate material makes contact with a compliant intermediate surface called a blanket cylinder which, in turn, applies the image to the paper or other medium. The paper is typically pinned to an impression cylinder in rolling contact with the blanket cylinder, which applies ink to the paper in accordance with the image.

In a wet lithographic system, the non-image areas are hydrophilic, and the necessary ink-repellency is provided by an initial application of a dampening (or "fountain") solution to the plate material prior to inking. The fountain solution prevents ink from adhering to the non-image areas but does not affect the oleophilic character of the image areas.

Different techniques have been developed for affixing plate material to underlying plate cylinders. Basic offset printing systems involve stationary clamping of a flexible length of plate material to the plate cylinder, while more advanced systems such as those described in U.S. Pat. Nos. 5,355,795 and 5,727,749 (both co-owned with the present application, and expressly incorporated herein by reference) use a relatively long length of plate material or web material stored in the form of rolls within a well or cavity in the plate cylinder. In these systems, a new segment of the plate or web material is advanced around the plate cylinder following completion of a print job. The new segment is imaged by an electronically controlled print head, which applies a print pattern to the surface.

Friction between the web material and the cylinder surface keeps web material stationary relative to the cylinder surface during each print job. As long as the force that tries to move the web does not exceed a critical value of the friction between the web and the cylinder surface, $F_c$, the web remains stationary against the cylinder surface without slipping. On one hand, a sufficiently high value of $F_c$ is especially important when the same length of the web is printed multiple times, e.g., each time with a different color, to complete an image. Slight movements will cause error in registration, e.g., misalignment between colors. On the other hand, too high an $F_c$ value hinders the smooth and quick advancement of the web material between print jobs. Therefore, an optimal $F_c$ needs to be balanced. $F_c$ is given by the formula $F_c = \mu_s \times N$, where $\mu_s$ is the static friction coefficient and N is the normal force exerted by the web on the cylinder surface.

Meanwhile, there are various forces that may cause the web to slip against the cylinder surface. For example, the web material experiences significant tangential forces as a result of contact with the blanket cylinder, the forces resulting primarily from slight differences in the rolling diameters of the mating cylinder surfaces, which are in contact at sufficient pressure to compress the compliant blanket cylinder surface. These forces tend to alter the orientation of the web material or dislodge it completely unless the critical value of the friction, $F_c$, remains high enough that it is not exceeded.

Various approaches have been taken to maintain proper friction between the web and the plate cylinder's surface during and between print operations. The static friction coefficient $\mu_s$ is normally constant during printing. The normal force N exerted on the cylinder surface, however, can be changed in order to adjust the friction. One approach is to ensure the amount of the web wrapped around the cylinder remains constant so that the normal force exerted by the web on the cylinder surface remains constant. In the '749 patent mentioned above, a mechanical tensioning mechanism is incorporated into the web-advancing system to ensure that the same amount of web material is dispensed from a supply spool, wrapped around the cylinder circumference, and wound up by an uptake spool. As fresh web material is needed, the uptake spool may be rotated under the action of a clutching motor while a lock (typically a ratchet and pawl assembly) is released on the supply spool to allow fresh web material to be drawn therefrom. After sensing or calculating the radius of at least one of the spools, the device in the '749 patent uses that information to adjust the amount of supply spool rotation allowed by a lock/brake system during each advancing cycle in order to compensate any effect on the amount of web payout that might result from changes in spool radius.

A different approach is to measure or detect changes in the traveling tension of the web and use that information to adjust the normal force exerted against the cylinder. For example, U.S. Patent Application Publication No. 2001/

0006029 by Ogawa et al. describes use of an angular displacement arm that swings as the web traveling tension changes. The angular displacement of the arm is used to calculate the traveling tension of the web, which is, in turn, used to adjust rotor speed of the spools. In U.S. Pat. No. 6,293,031 to Ringbom et al., pressure sensors are arranged between air nozzles adjacent the web to calculate the web tension.

None of these devices directly measures or detects the normal force exerted by the web material on the circumference of the cylinder. Therefore, a more precise, direct and immediate sensing system is needed to provide reliable and constant feedback to an actuation system that maintains an optimal web force against the cylinder circumference.

DESCRIPTION OF THE INVENTION

Brief Summary of the Invention

In accordance with the present invention, there is provided a system including a web-handling cylinder that has at least one sensor associated with the circumferential surface of the cylinder for detecting a force applied by the web against the cylinder surface. The force detected may be the normal force exerted by the web at the point on the cylinder surface where the sensor is located. The sensor may include a force-sensitive resistor, a load cell, or a piezo-electric sheet based sensor.

The system of the invention may further include an actuation device that, in response to the detected normal force exerted by the web, further adjusts the force. The decision to adjust the force may come from a processor that receives data input from the sensor. After the processor processes the data input, e.g., by comparing the detected force to a set value, the processor sends an output, e.g., a signal for adjustment, to the actuation device. The detection-adjustment process continues until the processor receives data indicating that the set value is met, thereby maintaining the normal force applied by the web at the set value.

For example, when the processor detects web slippage or loss of contact because virtually no normal force is detected, it signals the actuation device to increase the normal force against the cylinder. The actuation device may accomplish this by increasing the tension in the web material. In situations where the web material is fed from a supply spool to an uptake spool, the actuation device may be a positioning device that changes the position of at least one of the spools, affecting the tension in the web material. In one embodiment of the present invention, the supply and uptake spools are disposed in a single cavity in the cylinder. In another embodiment where the cylinder has multiple cavities separating the web-loading surface into multiple segments, the supply spool and the uptake spool of each pair are disposed in separate cavities. In both embodiments, each spool may be controlled by such a positioning device, which may change the spool position along a line. The cylinder may be a plate cylinder holding printing-plate material, a drum holding photoconductor panels, etc.

More broadly, the cylinder may be any cylinder or roll involved in web handling, either for a traveling web or, as in printing applications, a stationary web. Applications involving travelling webs include, for example, vacuum and non-vacuum coating operations in which the moving web travels over various cylinders as one or more coatings are applied. Such coating operations are used to manufacture a wide range of products, e.g., photographic film, lithographic printing plates and foil-lined packaging.

There is further provided a method for detecting a force applied by a web against a cylinder surface by associating at least one sensor with the circumferential surface of the cylinder. The method may further include using a processor to receive an input from the sensor, processing the input and sending an output to an actuation device that adjusts the normal forced applied by the web against the cylinder surface.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF ILLUSTRATIVE EMBODIMENTS

Figure 1:
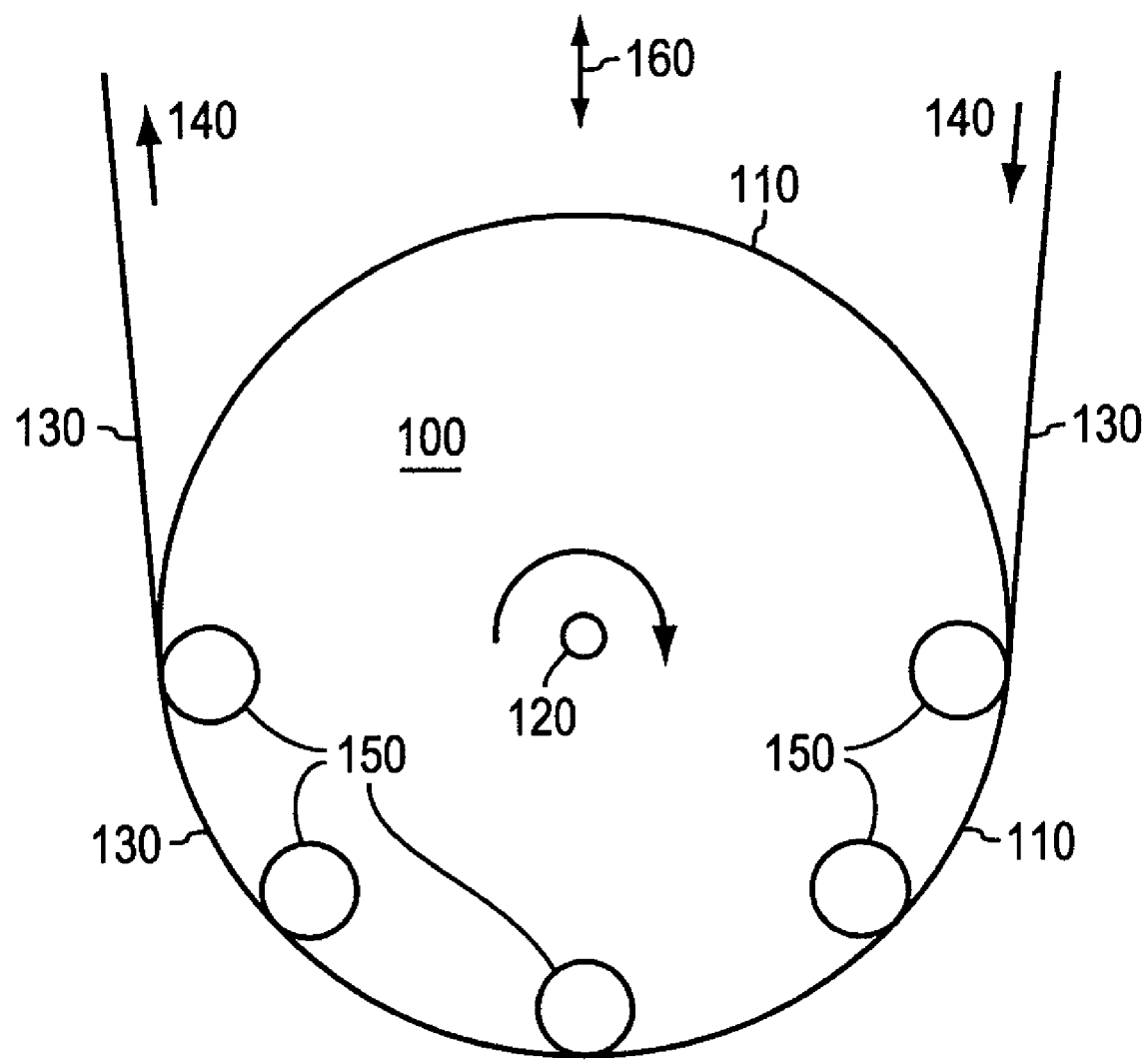
FIG. 1 is a cross-sectional view of a cylinder according to an embodiment of the present invention.

The present invention is useful in conjunction with any type of mechanism that advances sheet or web material around a cylinder. In one aspect, the invention provides sensors associated with the circumference of a web-handling cylinder for detecting the force applied by the web against the surface. Referring to FIG. 1, in a general scheme involving a moving web, a cylinder 100 having a circumferential surface 110 is shown in cross-section. The cylinder 100 may be stationary or may have a motor 120 that drives it to rotate, for example, clockwise as shown. A web or other material 130 is wrapped around at least a portion of the cylinder circumference 110. The web 130 may be stationary or traveling. For a traveling web, either due to a motor (not shown) that pulls the web material 130 or the cylinder motor 120 or both, the web material 130 travels around the portion of the cylinder circumference 110 that it is in contact with in a direction denoted by the arrows 140.

Still referring to FIG. 1, to detect the normal force or load applied by the web material 130 on various points of the cylinder's circumferential surface 110, one or more sensors 150 are associated with the surface 110 that is part of the traveling path of the web 140. For example, multiple sensors 150 may be affixed on the circumferential surface 110, or the sensors may be implanted in the surface 110. The sensors 150 may be spread out at certain intervals along the cylinder surface 110 to profile the web force exerted at various points against the cylinder surface 110 (see FIG. 3). Moreover, monitoring of the normal force by the sensors 150 can be intermittent or continuous.

Once information on the web force is detected by the sensors 150, that data may be used to activate an actuation device 160 (e.g., a pneumatic or hydraulic cylinder, a rack, etc.) that adjusts the web force, e.g., by adjusting the web's tension. Preferably, the information is sent to a processor and compared against a set value before adjustment is made. Once the adjustment is made, the sensors 150 detect deviations from the desired normal force on an ongoing basis. As a result, an automatic or "smart" adjustment system is provided to maintain the optimal normal force, and in turn, the optimal friction between the web material 130 and the cylinder surface 110.

Figure 2:
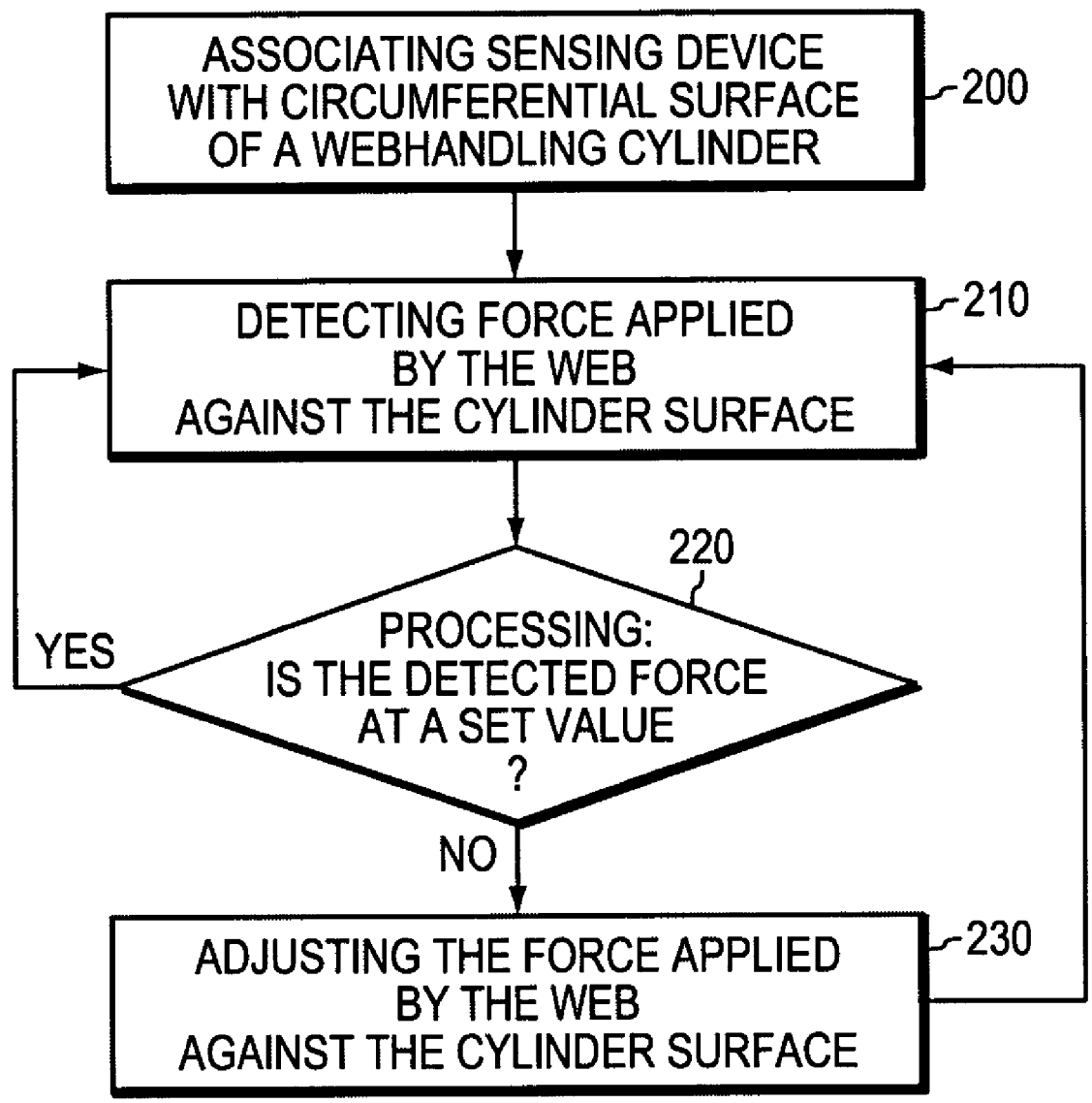
FIG. 2 is a block diagram outlining steps for a method and system in accordance with an embodiment of the present invention.

Referring now to FIG. 2, a block diagram is shown to illustrate a method and its corresponding system embodied in the invention. In an initial step 200, a sensing device is associated with the circumferential surface of a web-handling cylinder. In the next step 210, the sensing device detects the normal force applied by the web against the cylinder's circumferential surface. Then, the information is processed against a set value in step 220. That set value may be a single value or a range of acceptable values. If the detected force is at the set value, the system goes back to the detection step 210 and follows rest of the protocol. These steps can be repeated infinitely until the detected force is no longer at the preset value. If the detected force is not at the set value, e.g., when virtually no force is detected which indicates web slippage, a step 230 is taken to adjust the normal force applied by the web against the cylinder surface. The adjusting may be performed manually or automatically through the actuation device 160. The adjusted normal force exerted by the web is detected by the same sensing device (step 210) and processed by comparing at the set value (step 220). Again, further adjustment is made if the normal force is still not at the set value. Otherwise the protocol loops back to the detection step 210 and continues down the protocol. As a result, an automatic system is provided that can monitor the normal force continually or intermittently at a preset interval.

In one embodiment, the sensing device 150 includes one or more force sensitive resistors (FSR), for example, available from Interlink Electronics of Santa Barbara, Calif. FSRs usually contain a resistive ink patch sandwiched between two layers of polyester film. In a preferred embodiment, the FSR or FSR-based sensors are about 5 mils (0.127 mm) or less in thickness. When a normal force or load is applied on the FSR, the resistive ink patch causes a decrease in the sensor's resistance, which may be read out through a connected ohmmeter or multimeter.

In other embodiments, examples of the sensor 150 include a load cell, e.g., a button load cell, and a piezo-electric sheet based sensor. Piezo-electric sheet based sensors, for example, are suitable for detecting changes in a mechanical force with time.

A variety of layout options are possible for the sensors. In an exemplary embodiment illustrated in FIG. 3, the sensors 150 are affixed on the circumferential surface 110 of the cylinder 100 in arrays parallel to the cylinder's axis 310. Each array may contain as many sensors 150 as needed to detect the normal force or load at various points on the array. The entire cylinder surface 110 may contain as many arrays as needed to produce a profile of the normal force exerted by the web material wrapped around the cylinder to a desired resolution. All the sensors 150 in one array may be connected to a data bus 315. The data bus 315, which may be a conductive cable or an optical fiber, for example, may be further connected to a telemetric device (not shown) that sends sensed data, e.g., via radio signals, to a remote processor. Alternatively, the data bus 315 may be connected to a slip ring 318 or a similar device disposed on the cylinder axis 310. The slip ring 318 prevents the wiring from becoming entangled as the cylinder 100 rotates around its axis 310. The slip ring 318 may be connected, via a cable 320, to a computer system 330 having data processing functions. Optionally, the cable 320 links to a readout meter 340, e.g., a multimeter if the sensors 150 are FSRs, before leading into the computer system 330.

If the sensor 150 is thin enough, e.g., an FSR, it may be associated with the cylinder surface 110 by simply affixing it thereto, e.g., by an adhesive or glue, without substantially affecting the operation of the cylinder 100. Otherwise, the cylinder surface 110 may be machined to contain a recess, a cavity or a slot that fits the sensor 150. The sensor 150 may be disposed in the recess such that the sensor's force-sensitive surface is substantially flush with the cylinder surface 110. Necessary wiring, e.g., the sensor data bus 315 and connection between the data bus 315 and sensors 150, may also be affixed to the cylinder surface 110 or etched thereon as conductive traces or machined into the cylinder surface 110.

Figure 4:
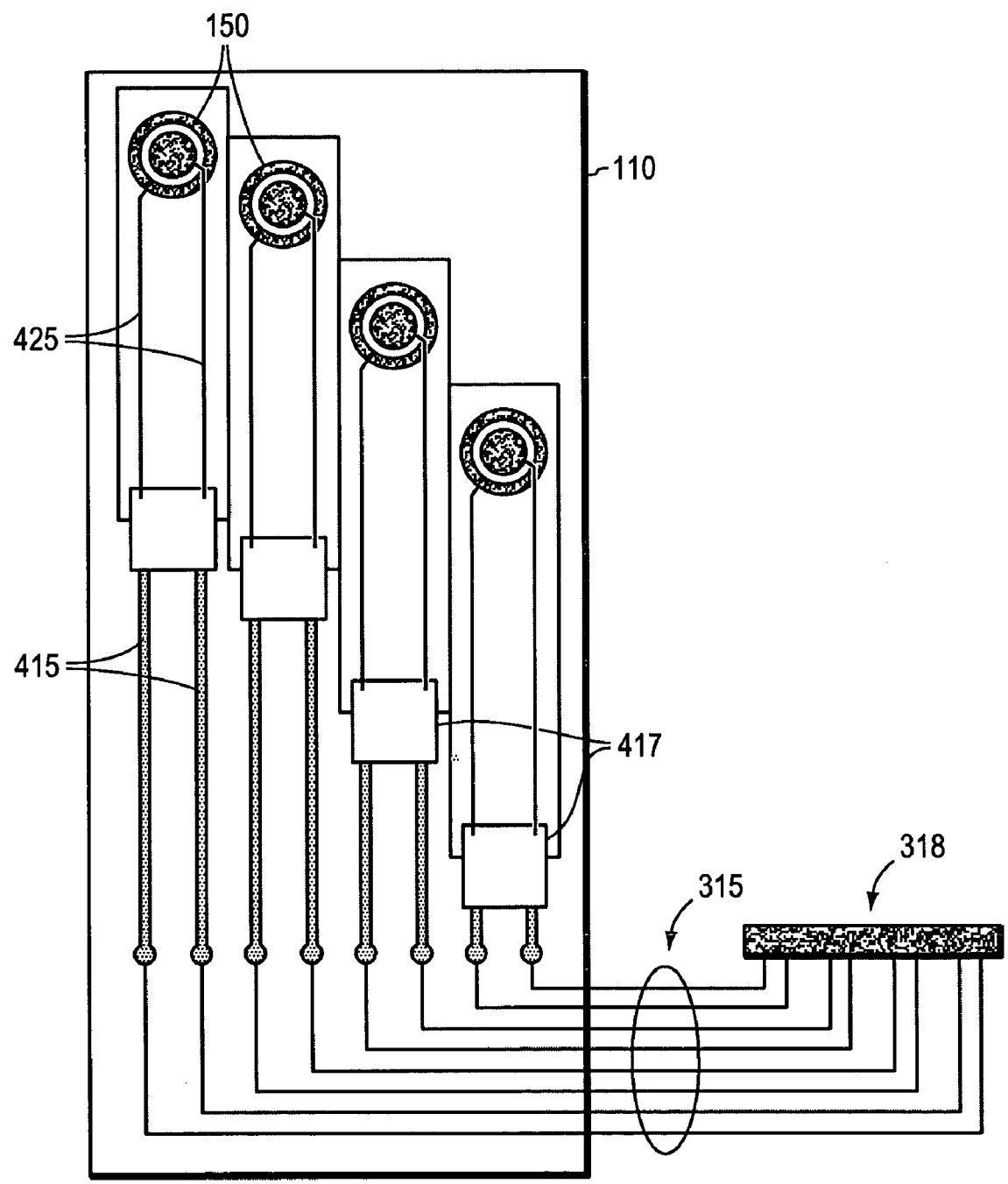
FIG. 4 is a more detailed view of sensor arrangement in accordance with an embodiment of the present invention.

FIG. 4 shows an embodiment according to the invention in greater detail. An array of sensors 150 is laid flat on the cylinder surface 110. These sensors 150 may be FSRs, and are connected to copper strip tape 415 via conductive tapes 417, e.g., Z-directional conductive tapes, and etched cabling 425. All these components are thin enough to be affixed to the cylinder surface 110 without requiring machining. The copper strip tapes 415 are further connected to a slip ring 318 via data bus 315. The slip ring 318 is illustrated here in a flat view.

Referring back to FIG. 3, a computer system 330 receives signals from the sensors 150 via the cable 320 and data bus 315. The computer system 330 includes a processor and, typically, volatile and non-volatile memory for data storage. The computer system 330 may also include analog-to-digital (A/D) circuitry to convert the analog signal from the sensors 150 to digital form for analysis, and any additional circuitry necessary to operate the sensors 150—e.g., a voltage or current source in the case of FSRs. Alternatively, such circuitry and/or measurement and/or A/D circuitry may be housed in a physically separate device 340. The computer system 330, which may be a personal computer, typically stores digital data in the memory and is programmed to calculate the normal force from the data received, if the data has not been calculated into the normal force already. The computer system 330 then compares the calculated normal force to a stored set value, which can be a range of values, and generates a signal output in digital or analog form corresponding to the adjustment in the web or cylinder that should be made. In other words, if the calculated normal force is at the set value, the computer system 330 generates a signal that no action is required or simply does not generate an action signal. If the calculated normal force is not at the set value, the computer system 330 generates a signal for tension adjustment.

It should be stressed that computer system 330 need not explicitly compute a force value from sensor data. For example, the data received by the computer system 330 may be the resistance of the sensor 150, which is only indicative of the normal force exerted by web on the sensor 150. The computer system 330 may compare the detected sensor resistance to a set resistance value and generate an adjustment signal based on the difference.

Figure 3:
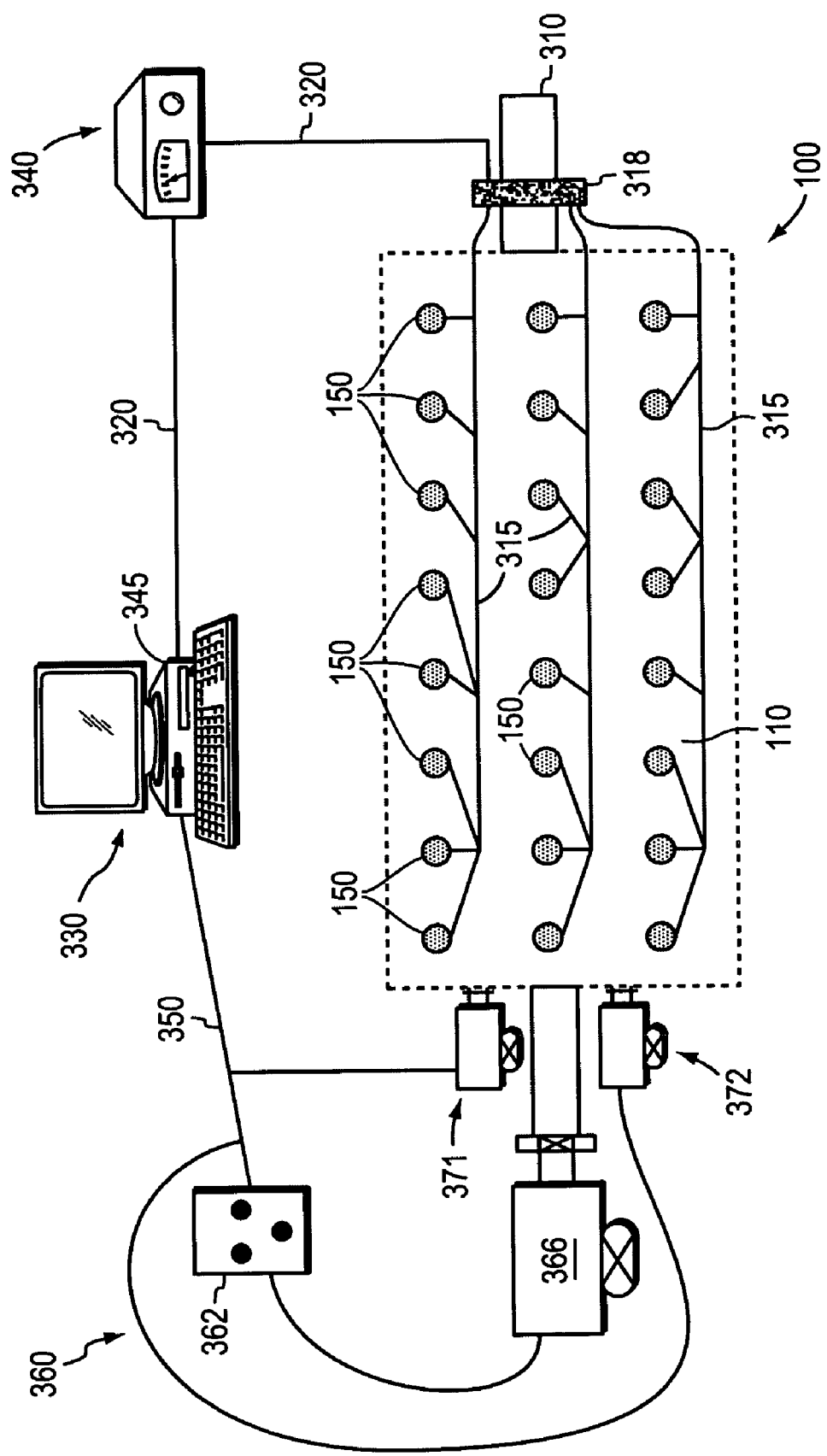
FIG. 3 is a schematic view of components in an embodiment of the present invention.

Still referring to FIG. 3, when the computer system 330 generates a signal for adjustment, the signal is sent via a signal bus 350 to an actuation device, indicated generally at 360. Alternatively, as described above in connection with FIG. 2, an operator might manually adjust the normal force by, e.g., shifting the position of the cylinder, tightening a clamp that secures the web around the cylinder or rotating one of the spools that the web is wound around.

The actuation device 360 is a device that effectuates a change in the normal force exerted by the web on the cylinder surface, which may involve adjusting the web or the cylinder or both.

Figure 5:
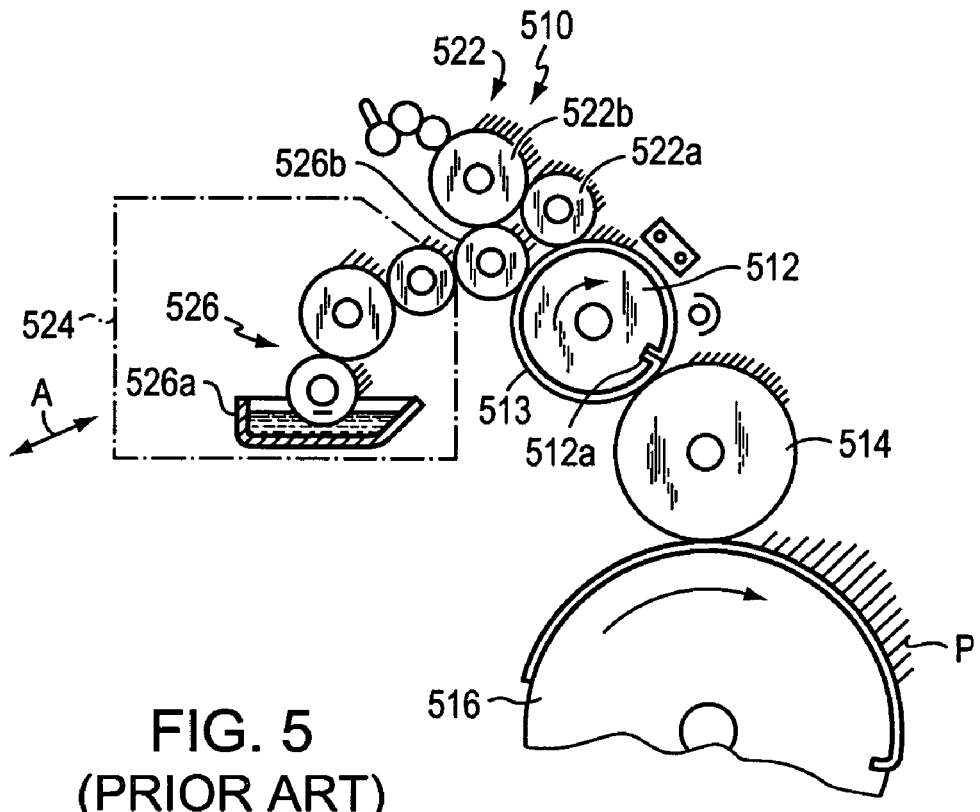
FIG. 5 is a partial diagrammatic view of an offset press with a lithographic printing plate which can incorporate the present invention.

As noted previously, the invention is useful in conjunction with any type of mechanism that advances sheet or web material around a cylinder (e.g., web-coating systems, paper-making systems, printing systems, etc.). The actuation components shown in FIG. 3 pertain to implementation in an on-press imaging environment, such as that illustrated in FIGS. 5 and 6, which will now be described. Refer to FIG. 5, which shows a more or less conventional offset press shown generally at 510 that can print copies using lithographic plates made in accordance with this invention.

Press 510 includes a print cylinder or drum 512 around which is wrapped a lithographic plate 513 whose opposite edge margins are secured to the cylinder 512 by a conventional clamping mechanism 512a incorporated into cylinder 512. Cylinder 512, or more precisely the plate 513 thereon, contacts the surface of a blanket cylinder 514 which, in turn, rotates in contact with an impression cylinder 516. The paper sheet P to be printed on is mounted to the surface of cylinder 516 so that it passes through the nip between cylinders 514 and 516 before being discharged to the exit end of the press 510. Ink for inking plate 513 is delivered by an ink train 522, the lowermost roll 522a of which is in rolling engagement with plate 513 when press 510 is printing. As is customary in presses of this type, the various cylinders are all geared together so that they are driven in unison by a single-drive motor.

The illustrated press 510 is capable of wet as well as dry printing. Accordingly, it includes a conventional dampening or fountain assembly 524 which is movable toward and away from drum 512 in the directions indicated by arrow A in FIG. 5 between active and inactive positions. Assembly 524 includes a conventional water train shown generally at 526, which conveys water from a tray 526a to a roller 526b which, when the dampening assembly is active, is in rolling engagement with plate 513 and the intermediate roller 522b of ink train 522.

When press 510 is operating in its dry printing mode, the dampening assembly 524 is inactive so that roller 526b is retracted from roller 522b and the plate 513 so that no water is applied to the plate. The lithographic plate 513 on cylinder 512 in this case is designed for such dry printing. As the cylinder 512 rotates, the plate 513 is contacted by the ink-coated roller 522a of ink train 522. The areas of the plate surface that have been written on and thus made oleophilic pick up ink from roller 522a. Those areas of the plate surface not written on receive no ink. Thus, after one revolution of cylinder 512, the image written on the plate will have been inked. That image is then transferred to the blanket cylinder 514 and, finally to the paper sheet P which is pressed into contact with the blanket cylinder.

When press 510 is operating in its wet printing mode, the dampening assembly 524 is active so that the water roller 526b contacts ink roller 522b and the surface of the plate or web 513, which is intended for wet printing. It has a surface that is hydrophilic except in the areas thereof which have been written on to make them oleophilic. Those areas, which correspond to the printed areas of the original document, shun water. In this mode of operation, as the cylinder 512 rotates (clockwise in FIG. 5), water and ink are presented to the surface of plate 513 by the rolls 526b and 522a, respectively. The water adheres to the hydrophilic areas of that surface corresponding to the background of the original document and those areas, being coated with water, do not pick up ink from roller 522a. On the other hand, the oleophilic areas of the plate surface (which have not been wetted by roller 526) pick up ink from roller 522a, again forming an inked image on the surface of the plate. As before, that image is transferred via blanket roller 514 to the paper sheet P on cylinder 516.

Figure 6:
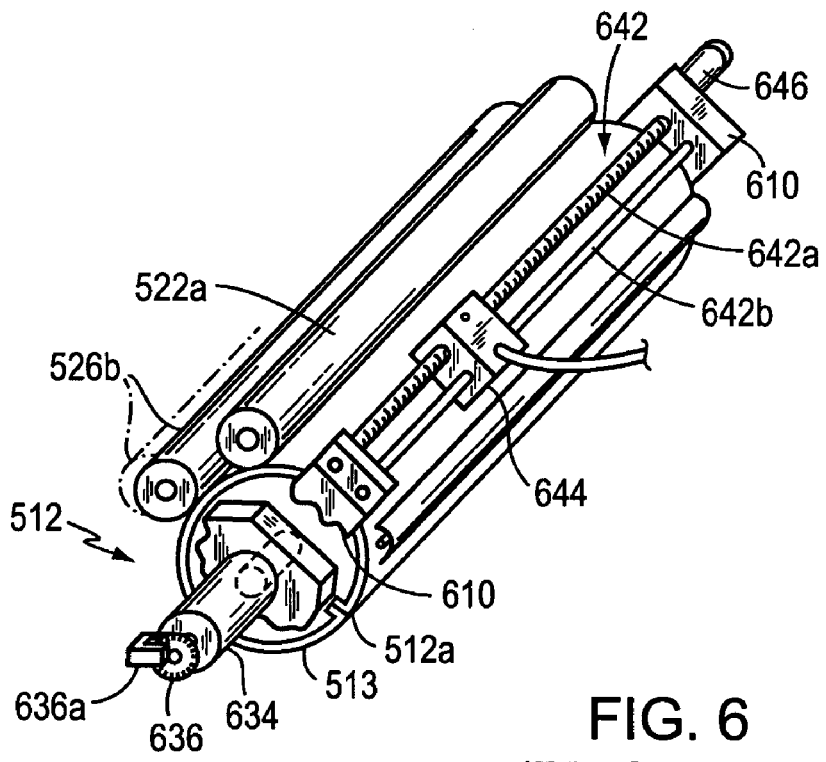
FIG. 6 is an isometric view on a larger scale showing in greater detail the plate cylinder portion of the FIG. 5 press.

While the image to be applied to the lithographic plate 513 can be written onto the plate while the plate is "off press," the present invention lends itself to imaging of a plate already mounted on the print cylinder 512. As shown in FIG. 6, the print cylinder 512 is rotatively supported by the press frame 610 and rotated by a standard electric motor 634 or other conventional means. The angular position of cylinder 512 is monitored by conventional means such as a shaft encoder 536 that rotates with the motor armature and associated detector 536a.

Also supported on frame 610 adjacent to cylinder 612 is a writing head assembly shown generally at 642. This assembly comprises a lead screw 642a whose opposite ends are rotatively supported in the press frame 610, which frame also supports the opposite ends of a guide bar 642b spaced parallel to lead screw 642a. Mounted for movement along the lead screw and guide bar is a carriage 644. When the lead screw 642a is rotated by a step motor 646, carriage 644 is moved axially with respect to print cylinder 512. The cylinder drive motor 634 and step motor 646 are operated in synchronism by a controller (not shown), which also receives signals from detector 636a, so that as the drum rotates, the carriage 644 moves axially along the drum with the controller "knowing" the instantaneous relative position of the carriage and cylinder at any given moment. The control circuitry required to accomplish this is well known in the scanner and plotter art; see also U.S. Pat. No. 5,174,205, incorporated herein by reference.

As discussed above, the plate or web may take the form of a rolled supply of material stored within cylinder 512 (in contrast to the traditional sheet configuration that must be individually wrapped around the cylinder). Moreover, multiple continuous supplies of plate/web material may be utilized, to reduce the frictional forces exerted on the plate material by the plate cylinder and to provide for multiple printing sections.

Figure 7:
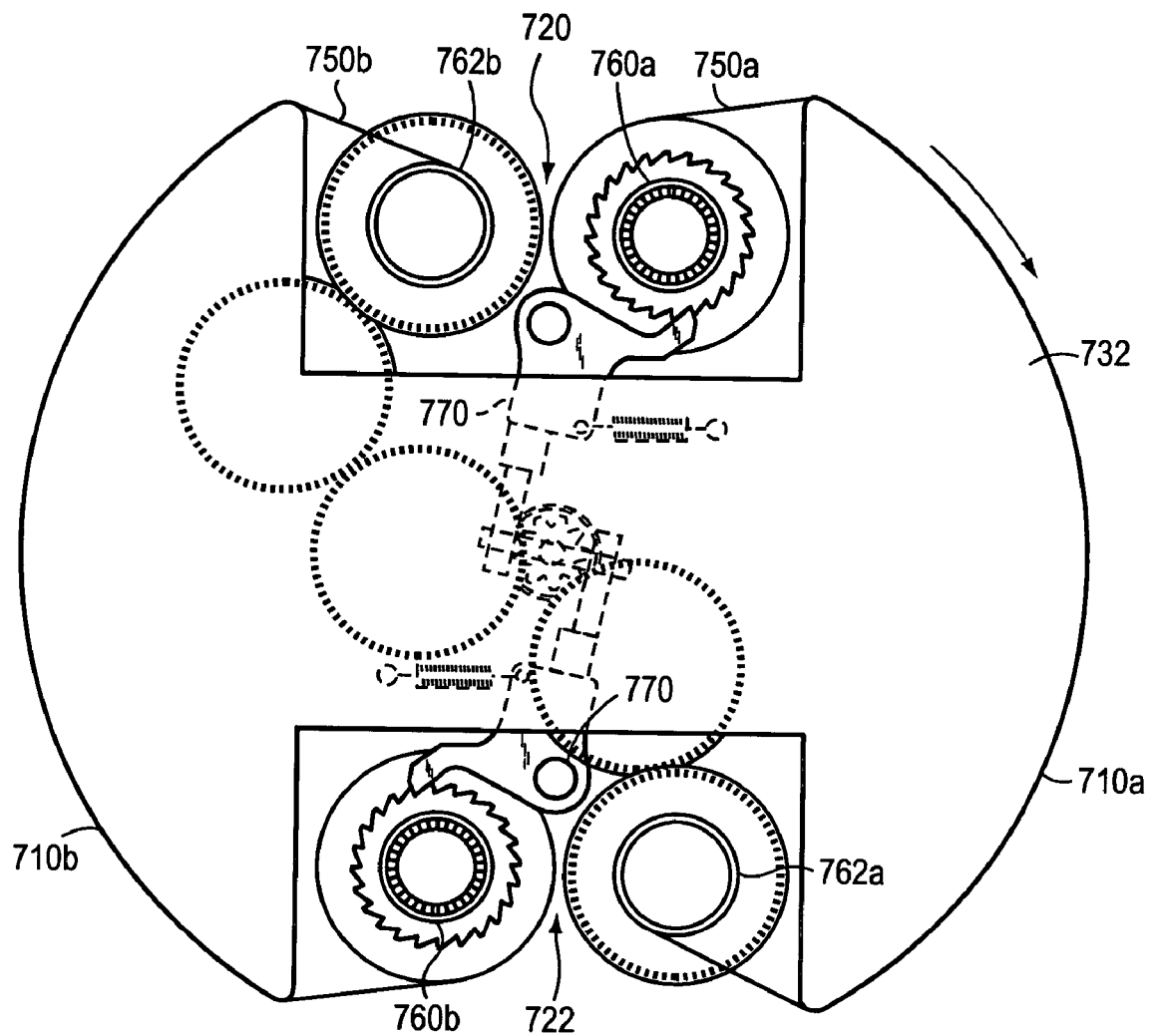
FIG. 7 is an end view of a plate cylinder employing a dual-plate material configuration with diametrically opposed printing segments, showing two pairs of supply and uptake components distributed in opposed cavities of the plate cylinder, which can also incorporate the present invention.

FIG. 7 illustrates components of a prior-art plate material supply and uptake apparatus, which is adapted for a dual-plate configuration with diametrically opposed printing segments 710a and 710b. The web material supply and uptake components in FIG. 7 are located in a pair of opposed cavities 720, 722 within cylinder 732. For example, a first segment 750a of web (or other recording) material wraps around a 710a portion of the circumference of cylinder 732, extending from a supply spool 760a rotatable within cavity 720 to an uptake spool 762a rotatable within cavity 722. And a second segment 750b of web material wraps around an opposed portion 710b of the surface of cylinder 732, extending from a supply spool 760b rotatable within cavity 722 to an uptake spool 762b rotatable within cavity 720. A ratchet-pawl system 770 controlling the amount of web dispensed is connected to each set of supply and uptake spools. Whether a plate cylinder is wrapped with a single supply or multiple segmented supplies of web material, it can benefit from the present invention.

Referring back to FIG. 3, the actuation device 360 useful in an on-press printing system may include multiple components such as a cylinder drive 362, a cylinder motor 366, a motor 371 for a web-supply spool, and a motor 372 for a web-uptake spool. Through these components, the actuation device 360 may adjust the web normal force through rotating the cylinder 100, the web-supply, the web-uptake spool, or any combination of the above. As the web is tightened, the normal force exerted by the web increases, and vice versa. The actuation device 360 may involve a drive or a brake.

Figure 8:
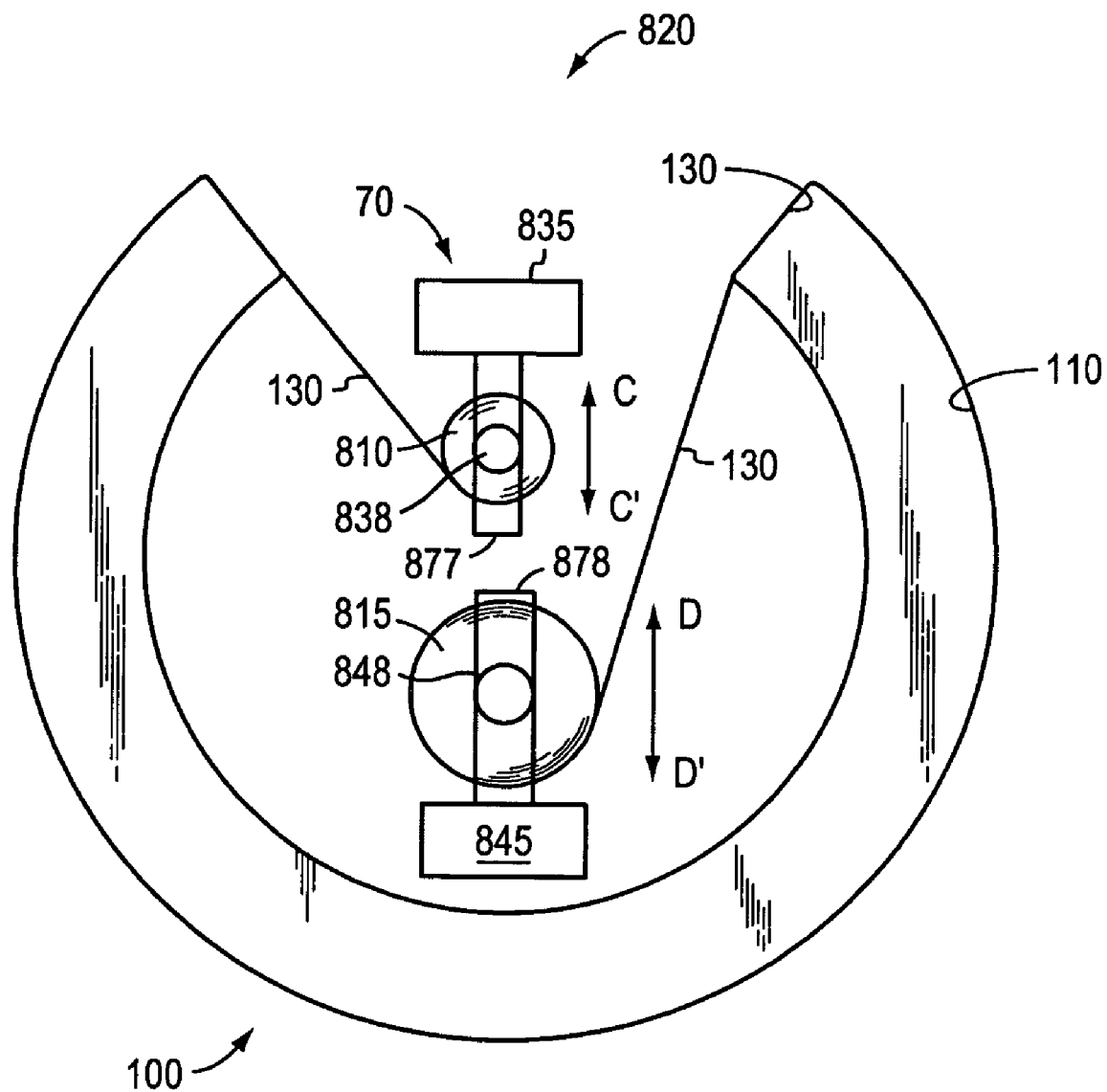
FIG. 8 is an end view of a single cavity plate cylinder with an actuation device that adjusts the normal force exerted by the web material against the cylinder surface in accordance with an embodiment of the present invention.

FIG. 8 illustrates an example of the actuation device 360, which operates by shifting the position of a web-supply spool 810 or a web-uptake spool 815 or both. In one embodiment, the cylinder 100 has a cavity 820 in which the web-supply spool 810 and the web-uptake spool 815 are situated. A first positioning device 835 translates the axis 838 of the supply spool 810. A second position device 845 translates axis 848 of the uptake spool 815. The position devices 835 and 845 may include a conventional motor, a rotating electric motor, a linear electric motor, a stepper motor, a pneumatic or hydraulic piston, and so on. Either positioning device 835 or 845 can affect the length of the web 130 that is wrapped around the circumferential surface 110 of the cylinder 100. In other words, the positioning device causes the tension in the web 130 to change, resulting in changes in the normal force the web 130 exerts on the cylinder surface 110. Preferably, the positioning device 835, 845 causes the spool to move in a linear fashion, e.g., within either the frame 877 or 878 as indicated by arrows C-C' or D-D' respectively. However, it should be understood that the positioning device can translate the spool in any line, curve or a combination of both.

When a signal for adjustment is transmitted from the process, the actuation device 360 is triggered. For example, if the signal indicates that more normal force is needed or web slippage is detected (i.e., insufficient normal force), the positioning device 835 may move the supply spool 810 in the direction indicated by the arrow C'. The other positioning device 845 may alternatively, simultaneously or separately moves the uptake spool 815 in the direction indicated by the arrow D'. As one or both of the spools 810 and 815 pulls web material 130 off the cylinder surface 110, the web around the surface 110 gets a higher tension, and exerts more normal force on the cylinder surface 110 or contacts the surface 110 again. This process may continue until the sensed normal force is at the set value.

If the signal from the processor indicates that too much normal force is detected, e.g., the above tightening is overdone, one or both of the positioning devices 835 and/or 845 may move their respective spool in the direction indicated by the arrows C and D respectively, until no more adjustment is needed as decided by the computer system 330.

Figure 9:
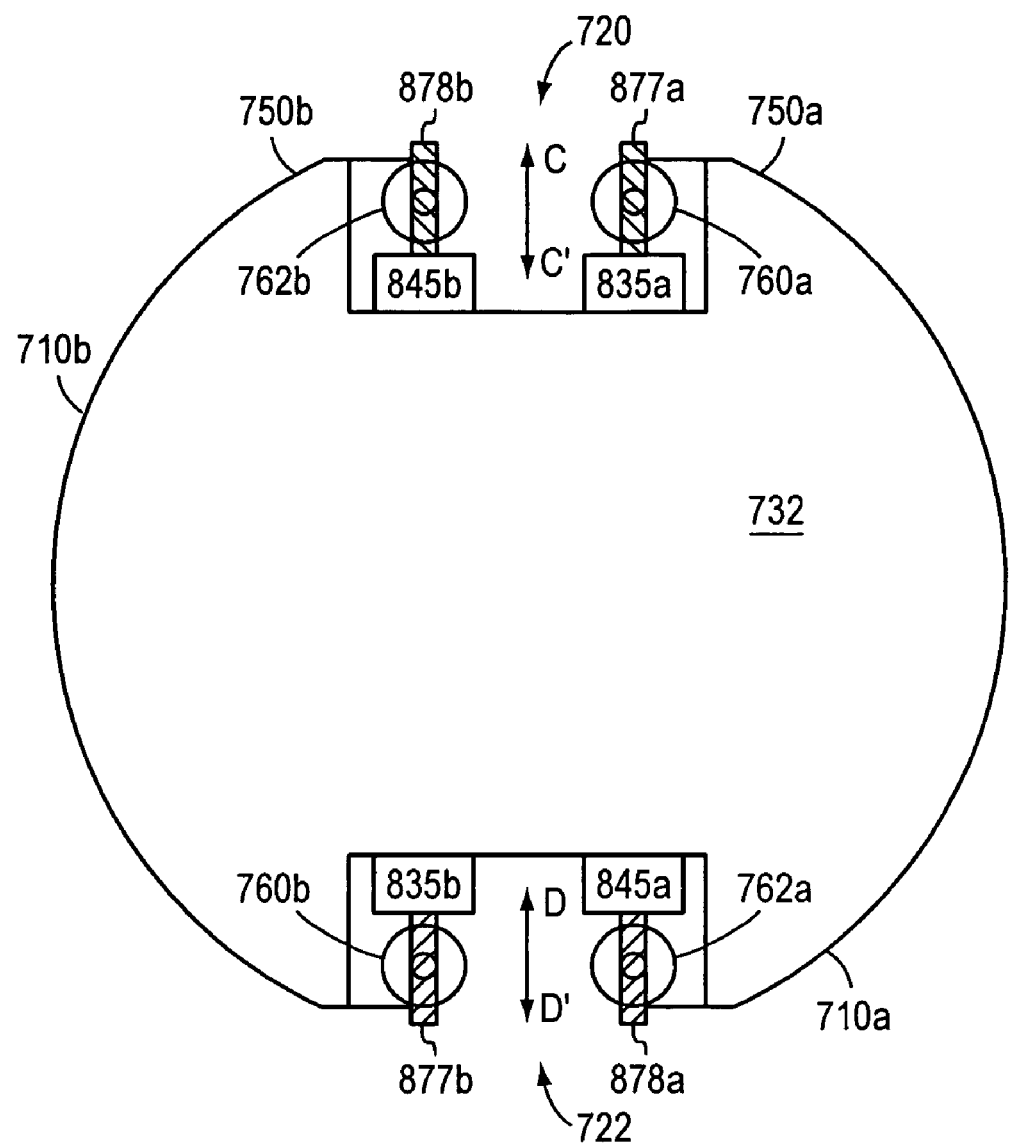
FIG. 9 is an end view of a plate cylinder having multiple cavities hosting multiple pairs of web-supply and uptake spools and their respective actuation devices in accordance with an alternative embodiment of the present invention.

FIG. 9 illustrates how the actuation device 360 can be adapted for a multi-segment web-loading configuration. The plate cylinder 732 in FIG. 9 has two opposed cavities 720 and 722 separating diametrically opposed printing segments 710a and 710b. For example, a first segment 750a of web (or other recording) material wraps around a 710a portion of the circumference of cylinder 732, extending from a supply spool 760a rotatable within cavity 720 to an uptake spool 762a rotatable within cavity 722. And a second segment 750b of web material wraps around an opposed portion 710b of the surface of cylinder 732, extending from a supply spool 760b rotatable within cavity 722 to an uptake spool 762b rotatable within cavity 720. A positioning device as described in connection with FIG. 8 can be used to displace the position of any of the four spools. In one embodiment, the spools 760a and 762a are controlled by positioning devices 835a and 845a respectively to move along the arrows C-C' and D-D' and within the frames 877a and 878a. Similarly, the spools 760b and 762b are also controlled by positioning devices 835b and 845b respectively to move along the arrows C-C' and D-D' and within the frames 877b and 878b.

While FIG. 9 portrays a dual-segment web-loading configuration, it should be recognized, however, that this configuration is exemplary only; the present invention can include more than two pairs of uptake and supply spools and/or more than two cavities distributed evenly or otherwise around the cylinder.

In yet another embodiment, the actuation device 360 comprises a tensioning roll that moves into contact with a web when more normal web force is needed. Such a tensioning roll is disclosed in co-owned U.S. Pat. No. 6,325,322 and incorporated herein by reference.

The terms and expressions employed herein are used as terms of description and not limitation, and there is no intention, in the use of such terms and expressions, of excluding any equivalents of the features shown and described or portions thereof, but it is recognized that various modifications are possible within the scope of the invention.

What is claimed is:

1. A web-handling system comprising:
   a) a cylinder including a circumferential surface and a sensing device comprising at least one sensor associated with the circumferential surface for detecting a force applied by a web against the surface; and
   b) an actuation device, responsive to the detected force, for adjusting the force applied by the web against the circumferential surface of the cylinder, wherein the actuation device comprises at least one positioning device that changes the position of at least one of a web-supply spool and a web-uptake spool.

2. The system of claim 1 wherein the positioning device changes spool position along a line.

3. The system of claim 1 wherein the cylinder further comprises a cavity, and the web-supply spool and the web-uptake spool are disposed in the cavity.

4. The system of claim 1 wherein the cylinder further comprises multiple cavities, and the web-supply spool and the web-uptake spool are disposed in separate cavities.

5. A web-handling system comprising:
   a) a cylinder including a circumferential surface and a sensing device comprising at least one sensor associated with the circumferential surface for detecting a force applied by a web against the surface; and
   b) an actuation device, responsive to the detected force, for adjusting the force applied by the web against the circumferential surface of the cylinder, wherein the sensing device, together with the actuation device, maintains a range of set values for the force applied by the web against the circumferential surface of the cylinder, and wherein the actuation device comprises a first positioning device that changes the position of a web-supply spool and a second positioning device that changes the position of a web-uptake spool.

6. A method for adjusting a force applied by a web against a cylinder surface, the method comprising the steps of:
   a) associating a sensing device comprising at least one sensor with a circumferential surface of the cylinder for detecting a force applied by the web against the surface; and
   b) adjusting the force applied by the web against the circumferential surface of the cylinder in response to the force detected by the at least one sensor, wherein the adjusting step comprises changing the position of at least one of a web-supply spool and a web-uptake spool.

7. The method of claim 6 wherein the web-supply spool and the web-uptake spool are disposed in one cavity in the cylinder.

8. The method of claim 6 wherein the web-supply spool and the web-uptake spool are disposed in separate cavities in the cylinder.

* * * * *